United States Patent
Kondo (10) Patent No.: US 10,764,632 B2
(45) Date of Patent: Sep. 1, 2020

(54) VIDEO SIGNAL PROCESSING APPARATUS, VIDEO SIGNAL PROCESSING METHOD, AND PROGRAM

(71) Applicant: I-CUBED RESEARCH CENTER INC., Tokyo (JP)

(72) Inventor: Tetsujiro Kondo, Tokyo (JP)

(73) Assignee: I-CUBED RESEARCH CENTER INC., Tokyo (JP)

( * ) Notice: Subject to any disclaimer, the term of this patent is extended or adjusted under 35 U.S.C. 154(b) by 0 days.

(21) Appl. No.: 16/313,531

(22) PCT Filed: Jun. 29, 2017

(86) PCT No.: PCT/JP2017/024009
§ 371 (c)(1),
(2) Date: Dec. 27, 2018

(87) PCT Pub. No.: WO2018/003938
PCT Pub. Date: Jan. 4, 2018

(65) Prior Publication Data
US 2019/0174181 A1    Jun. 6, 2019

(30) Foreign Application Priority Data
Jun. 30, 2016 (JP) ................. 2016-129688

(51) Int. Cl.
*G09G 5/00* (2006.01)
*H04N 21/4402* (2011.01)
(Continued)

(52) U.S. Cl.
CPC .......... *H04N 21/4402* (2013.01); *G09G 5/00* (2013.01); *G09G 5/003* (2013.01); *H04N 5/14* (2013.01);
(Continued)

(58) Field of Classification Search
CPC ........ H04N 5/14; H04N 5/222; H04N 5/2258; H04N 5/232; H04N 7/01; H04N 7/0117;
(Continued)

(56) References Cited

U.S. PATENT DOCUMENTS 6,611,290 B1   8/2003   Sato
6,822,758 B1   11/2004  Morino
(Continued)

FOREIGN PATENT DOCUMENTS

EP   1667066 A1   6/2006
JP   H10-276349 A   10/1998
(Continued)

OTHER PUBLICATIONS

International Search Report issued in Application No. PCT/JP2017/024009 dated Aug. 8, 2017, with English translation.
(Continued)

*Primary Examiner* — Joe H Cheng
(74) *Attorney, Agent, or Firm* — McDermott Will & Emery LLP (57) ABSTRACT

In order to address a conventional problem that video signal processing in consideration of system features has not been performed, a video signal processing apparatus includes: a system feature accepting unit that accepts one or at least two system features from when an image is acquired to when an image is output; an input image accepting unit that accepts an input image; a conversion processing unit that performs conversion processing that acquires an output image from the input image, using the system features; and an output unit that outputs the output image acquired by the conversion processing unit. Accordingly, it is possible to perform video signal processing in consideration of system features.

9 Claims, 4 Drawing Sheets

(51) Int. Cl.
*H04N 5/14* (2006.01)
*H04N 5/232* (2006.01)
*H04N 7/01* (2006.01)
*H04N 21/00* (2011.01)
*H04N 5/225* (2006.01)

(52) U.S. Cl.
CPC ........... *H04N 5/2258* (2013.01); *H04N 5/232* (2013.01); *H04N 7/01* (2013.01); *H04N 7/0117* (2013.01); *H04N 21/00* (2013.01)

(58) Field of Classification Search
CPC ...... H04N 21/00; H04N 21/4402; G09G 5/00; G09G 5/003; G09G 2340/0407
See application file for complete search history.

(56) References Cited

U.S. PATENT DOCUMENTS

| | | | |
|---|---|---|---|
| 9,672,650 B2 * | 6/2017 | Kondo | G06F 3/1446 |
| 10,092,166 B2 * | 10/2018 | Honma | A61B 1/00045 |
| 2002/0019892 A1 | 2/2002 | Kondo et al. | |
| 2008/0042922 A1 | 2/2008 | Miyazawa | |
| 2010/0053350 A1 | 3/2010 | Miyauchi et al. | |
| 2014/0132834 A1 * | 5/2014 | Kondo | H04N 13/122 348/441 |
| 2016/0150180 A1 | 5/2016 | Kozuka et al. | |
| 2019/0228744 A1 * | 7/2019 | Kondo | G09G 5/363 |

FOREIGN PATENT DOCUMENTS

| | | |
|---|---|---|
| JP | 2000-020691 A | 1/2000 |
| JP | 2001-318745 A | 11/2001 |
| JP | 2008-244818 A | 10/2008 |
| JP | 2014-150308 A | 8/2014 |
| WO | 2015/194102 A1 | 12/2015 |

OTHER PUBLICATIONS

Bo Shen et al., "Dynamic Video in Mobile Environments," IEEE Multimedia, IEEE Service Center, Jan. 1, 2008, vol. 15, No. 1, pp. 42-51.

Supplementary European Search Report issued in corresponding European Application No. 17820293.5 dated Dec. 19, 2019.

* cited by examiner

VIDEO SIGNAL PROCESSING APPARATUS, VIDEO SIGNAL PROCESSING METHOD, AND PROGRAM

RELATED APPLICATIONS

This application is the U.S. National Phase under 35 U.S.C. § 371 of International Application No. PCT/JP2017/024009, filed Jun. 29, 2017, which in turn claims the benefit of Japanese Application No. 2016-129688, filed on Jun. 30, 2016, the disclosures of which are incorporated by reference herein.

BACKGROUND OF THE INVENTION

1. Field of the Invention

The present invention relates to a video signal processing apparatus and the like for processing video signals.

2. Description of Related Art

Conventionally, there are video signal processing apparatuses capable of avoiding a problem that the same pixel data stored in memories is simultaneously read by multiple processes, without enlarging the sizes of the memories in which video signals are stored (see JP 2014-150308A, for example).

However, according to such conventional techniques, video signal processing in consideration of one or at least two system features from when an image is acquired to when an image is output has not been performed. Accordingly, there are cases in which the hardware becomes larger than necessary or the performance is lowered by a mismatch between a system and processing. The mismatch between a system and processing is a state in which, since processing that does not conform to system features is performed, a deterioration of an image occurs, for example. More specifically, the mismatch between a system and processing is, for example, a state in which, since processing is performed without consideration of optical features of a camera, a deterioration of an image derived from the optical features of the camera is emphasized.

SUMMARY OF THE INVENTION

A first aspect of the present invention is directed to a video signal processing apparatus, including: a system feature accepting unit that accepts one or at least two system features from when an image is acquired to when an image is output; an input image accepting unit that accepts an input image; a conversion processing unit that performs conversion processing that acquires an output image from the input image, using the system features; and an output unit that outputs the output image acquired by the conversion processing unit.

With this configuration, it is possible to perform video signal processing in consideration of one or more system features.

Furthermore, a second aspect of the present invention is directed to the video signal processing apparatus according to the first aspect, wherein the system features include a camera feature, which is a feature of a camera that captures an image.

With this configuration, it is possible to perform video signal processing in consideration of camera features.

Furthermore, a third aspect of the present invention is directed to the video signal processing apparatus according to the first aspect, wherein the system features include a transmission line feature, which is a feature of a transmission line through which an image is transmitted.

With this configuration, it is possible to perform video signal processing in consideration of transmission line features.

Furthermore, a fourth aspect of the present invention is directed to the video signal processing apparatus according to the first aspect, wherein the system features include an output device feature, which is a specific feature of an output apparatus that outputs an image.

With this configuration, it is possible to perform video signal processing in consideration of output device features.

Furthermore, a fifth aspect of the present invention is directed to the video signal processing apparatus according to any one of the first to fourth aspects, wherein the system feature accepting unit accepts one or at least two system features from the outside.

With this configuration, it is possible to perform video signal processing using system features acquired from the outside.

Furthermore, a sixth aspect of the present invention is directed to the video signal processing apparatus according to any one of the first to fifth aspects, wherein the video signal processing apparatus further includes a storage unit in which two or more look-up tables having one or more correspondence records for identifying correspondence between an input image and an output image are stored each in association with one or at least two system features, and the conversion processing unit selects a look-up table corresponding to the one or more system features accepted by the system feature accepting unit, from among the two or more look-up tables, and performs conversion processing that acquires an output image from the input image, using the selected look-up table.

With this configuration, it is possible to perform video signal processing in consideration of features of a system from when an image is acquired to when an image is output.

Furthermore, a seventh aspect of the present invention is directed to the video signal processing apparatus according to any one of the first to fifth aspects, wherein the video signal processing apparatus further includes a storage unit in which an image conversion operation expression, which is an operation expression for performing image conversion, is stored, and in which one or at least two pieces of change information, which is information for changing a parameter of an image conversion operation expression, is stored in association with one or at least two system features, and the conversion processing unit acquires change information corresponding to the one or more system features accepted by the system feature accepting unit, changes the image conversion operation expression, using the change information, and performs conversion processing that acquires an output image from the input image, using the changed image conversion operation expression.

With this configuration, it is possible to perform video signal processing in consideration of features of a system from when an image is acquired to when an image is output.

Furthermore, an eighth aspect of the present invention is directed to the video signal processing apparatus according to any one of the first to fifth aspects, wherein the video signal processing apparatus further includes a storage unit in which one or at least two pieces of change information for changing a spatio-temporal tap arrangement are stored in association with one or at least two system features, and the conversion processing unit acquires change information corresponding to the one or more system features accepted by the system feature accepting unit, and performs conversion processing that acquires an output image from the input image, using the change information.

With this configuration, it is possible to perform video signal processing in consideration of features of a system from when an image is acquired to when an image is output.

According to the video signal processing apparatus of the present invention, it is possible to perform video signal processing in consideration of one or more system features.

DETAILED DESCRIPTION OF THE INVENTION

Hereinafter, an embodiment of a video signal processing apparatus and the like will be described with reference to the drawings. It should be noted that constituent elements denoted by the same reference numerals in the embodiments perform similar operations, and thus a description thereof may not be repeated.

Embodiment 1

In this embodiment, a video signal processing apparatus for performing conversion processing on an input image using a later-described system feature, thereby acquiring an output image, and outputting the image will be described. The system feature refers, for example, a feature of one or more apparatuses, or a transmission line feature.

Figure 1:
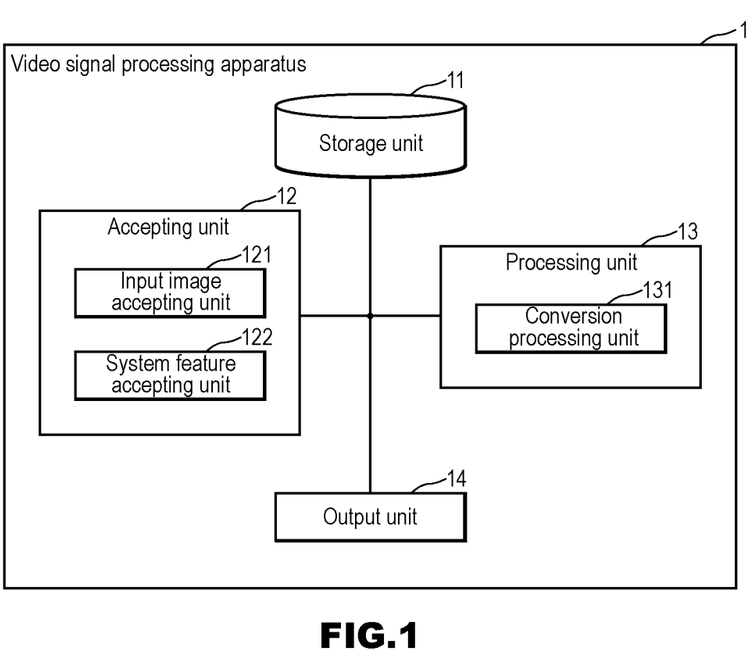
FIG. 1 is a block diagram of a video signal processing apparatus 1 in Embodiment 1.

FIG. 1 is a block diagram of a video signal processing apparatus 1 in this embodiment.

The video signal processing apparatus 1 includes a storage unit 11, an accepting unit 12, a processing unit 13, and an output unit 14.

The accepting unit 12 includes an input image accepting unit 121 and a system feature accepting unit 122.

The processing unit 13 includes a conversion processing unit 131.

In the storage unit 11, various types of information can be stored. The various types of information are, for example, one or at least two look-up tables (hereinafter, also referred to as "LUTs" as appropriate). The various types of information are, for example, one or at least two pieces of change information, or one or at least two image conversion operation expressions.

The look-up table has one or at least two correspondence records. Each correspondence record is information for identifying correspondence between one or at least two input images and one or at least two output images. In the storage unit 11, two or more look-up tables may be stored in association with one or at least two system features. The information for identifying correspondence between input images and output images is information for identifying correspondence between the whole or part of input images and the whole or part of output images. If the number of correspondence records contained in a look-up table is one, the correspondence record is, for example, an operation expression for converting an image, or one or more parameter groups that are to be given to an operation expression for converting an image. The correspondence record may be, for example, an operation expression for calculating the median of pixel values of a spatio-temporal block.

The image conversion operation expression is an operation expression for performing image conversion. The operation expression is, for example, a multiply-accumulate operation related to a tap arranged in spacetime. Examples of the parameter include coefficients of a multiply-accumulate operation, determination parameters for determining system features, and the like. The tap refers to pixel values of a pixel of interest and pixels in the vicinity thereof in an input image. That is to say, the operation expression related to a tap arranged in spacetime is an operation expression of the multiply-accumulate operation for multiplying each of pixel values of a pixel of interest and pixels in the vicinity thereof in an input image by a predetermined coefficient, and computing the sum of all results obtained through the multiplication. The pixel of interest and the pixels in the vicinity thereof in an input image are two or more pixels, and there is no limitation on the number of the pixels.

The change information is information for changing an input image. The change information is, for example, information for changing a parameter of an image conversion operation expression. The information for changing a parameter is, for example, an operation expression for determining a coefficient of a multiply-accumulate operation according to a system feature.

In the storage unit 11, one or more pieces of change information may be stored in association with one or at least two system features. In the storage unit 11, one or more image conversion operation expressions may be stored in association with one or at least two system features.

The change information may be information for changing a spatio-temporal tap arrangement. In the storage unit 11, one or at least two pieces of change information for changing a spatio-temporal tap arrangement may be stored in association with one or at least two system features. The spatio-temporal tap arrangement is information indicating which pixel is to be used for processing, among a pixel of interest and pixels in the vicinity thereof in an input image.

The change information may be information for changing a coefficient of a multiply-accumulate operation. In the storage unit 11, one or at least two pieces of change information for changing a coefficient may be stored in association with one or at least two system features. The change information preferably has information for changing a spatio-temporal tap arrangement and a coefficient of a multiply-accumulate operation.

Furthermore, the system features are one or more features from when an image is acquired to when an image is output. The acquiring an image is, for example, capturing an image, reading an image, or the like. The outputting an image is, for example, showing an image to a user, displaying an image on a display screen, or the like. The one or more features from when an image is acquired to when an image is output are, for example, a camera feature, which is a feature of a camera that captures an image, a feature of a transmission line, a feature of an output device, or the like. The system features are, for example, a feature of the entire system from when an image is acquired to when an image is output. The feature of the entire system is, for example, a relationship between the bit precision of an image capturing device, the bit precision of a transmission line, and the bit precision of an output device. When a bit precision (1) of an image capturing device is 14 bits, a bit precision (2) of a transmission line is 10 bits, and a bit precision (3) of an output device is 12 bits, the relationship between the bit precisions may be expressed, for example, as a combination of the bit precisions, i.e., (1)=14·(2)=10·(3)=12, or as a relative increase or decrease, i.e., (1)−(2)=+4, (2)−(3)=−2.

The feature of the entire system is, for example, a relationship between the number of pixels of an image capturing device, the number of pixels of an image format that is used in a transmission line, and the number of pixels of an output device.

The system features preferably include a camera feature, which is a feature of a camera that captures an image. The camera feature is, for example, an optical feature of a camera. The optical feature of a camera is, for example, an optical feature of a lens. The optical feature of a lens is, for example, an MTF (modulation transfer function) or a wavelength feature of a lens. The optical feature of a camera is a feature of an optical filter of a camera. The feature of an optical filter is, for example, a feature of an optical low-pass filter attached to a sensor, for example, an MTF. The optical feature of a camera is, for example, a feature of a shutter. The feature of a shutter is, for example, a shutter speed, a shutter method (a rolling shutter method or a global shutter method), or the like. The camera feature is, for example, information indicating whether or not there is an optical LPF in an image sensor of a camera. The camera feature is, for example, information for specifying the device type of an image sensor. The information for specifying the device type of an image sensor is, for example, "CCD", "CMOS", or the like. The camera feature is, for example, a bit length of a camera. Examples of the camera feature include, in addition to an optical feature of a camera, a feature of conversion from light to electricity of a sensor. The feature of conversion from light to electricity is, for example, a quantization feature, or a spatio-temporal sampling.

The system features preferably include a transmission line feature, which is a feature of a transmission line through which an image is transmitted. The transmission line feature is, for example, information for specifying a coding method, a coding parameter, or a bit rate. The information for specifying a coding method is, for example, "MPEG2", "H.264", "H.265", or the like.

The system features preferably include an output device feature, which is a specific feature of an output apparatus that outputs an image. The output device feature is, for example, a resolution of a display screen, a bit length at an output limit of a display screen, or an output frame rate of a display screen. The output device feature is, for example, a maximum luminance of a display screen, a light source of a display screen, or a drive method of a presentation element. The output device feature is, for example, the type of display screen. The type of display screen is, for example, CRT, liquid crystal, plasma, organic EL, projector, or the like.

The accepting unit 12 accepts various types of information. The various types of information is, for example, an input image, a system feature, information on the storage unit 11, or the like. The accepting is typically receiving information transmitted via a wired or wireless communication line, but is a concept that encompasses accepting information input from an input device such as a keyboard, a mouse, or a touch panel, accepting information read from a storage medium such as an optical disk, a magnetic disk, or a semiconductor memory, and the like.

The input image accepting unit 121 accepts an input image. For example, the input image accepting unit 121 receives an input image. The input image accepting unit 121 may be realized, for example, by a wireless or wired communication part, a broadcast receiving part, or the like. For example, the input image accepting unit 121 reads an input image from an unshown storage medium.

The system feature accepting unit 122 accepts one or at least two system features. The system features are one or at least two features from when an image is acquired to when an image is output.

The system feature accepting unit 122 may accept one or at least two system features from the outside. The system feature accepting unit 122 may receive one or more system features from the outside (e.g., from an unshown broadcasting apparatus).

The system feature accepting unit 122 may read one or more system features from an unshown storage medium.

The system feature accepting unit 122 may accept one or more system features that are input by a user.

The system feature accepting unit 122 may acquire one or more system features associated with an input image. In this case, the accepting unit 12 receives an input image and one or more system features.

Furthermore, the system feature accepting unit 122 may acquire an output device feature, from information on connection with a device to which output is to be performed. For example, the system feature accepting unit 122 may acquire device model information of an output device and the like using EDID (extended display identification data) of HDMI or the like.

Furthermore, the system feature accepting unit 122 may acquire a system feature from an input image. For example, the system feature accepting unit 122 may acquire, from an input image, a coding parameter when the image is transmitted.

Furthermore, the system feature accepting unit 122 may analyze an input image and estimate a system feature. For example, the system feature accepting unit 122 may estimate a lens feature from a resolution appearance at the center of an image and a resolution appearance at a peripheral portion thereof. The system feature accepting unit 122 may estimate a shutter time from a motion vector of an image and a blurring amount in its motion direction. When blurring hardly occurs in an image although a motion between frames is large, it can be estimated that the shutter time is short. That is to say, the system feature accepting unit 122 acquires a motion amount of a subject between frames, and acquires information indicating a blurring level of the subject. The system feature accepting unit 122 acquires a shutter time, using the motion amount of the subject and the information indicating the blurring level. For example, the system feature accepting unit 122 has, for example, a correspondence table between a motion amount of a subject, information indicating a blurring level, and a shutter time, and acquires a shutter time corresponding to a motion amount of a subject and information indicating a blurring level, using the correspondence table. The technique for acquiring a shutter time may be a known technique.

The processing unit 13 performs various types of processing. The various types of processing are, for example, processing that is performed by the conversion processing unit 131.

The conversion processing unit 131 performs conversion processing that acquires an output image from the input image, using a system feature. The system features are typically one or more system features accepted by the system feature accepting unit 122.

The conversion processing unit 131 may select a look-up table corresponding to the one or more system features accepted by the system feature accepting unit 122, from among the two or more look-up tables in the storage unit 11, and perform conversion processing that acquires an output image from the input image, using the selected look-up table.

The conversion processing unit 131 may acquire change information corresponding to the one or more system features accepted by the system feature accepting unit 122, change an image conversion operation expression, using the change information, and perform conversion processing that acquires an output image from the input image, using the changed image conversion operation expression.

The conversion processing unit 131 may acquire change information corresponding to the one or more system features accepted by the system feature accepting unit 122, and perform conversion processing that acquires an output image from the input image, using the change information.

The conversion processing unit 131 preferably performs the above-described processing, using two or more types of system features.

Furthermore, the conversion processing unit 131 preferably performs different processing on the input image, depending on a relationship between two or more system features accepted by the system feature accepting unit 122.

For example, information related to a relationship between a bit length of a camera and a bit length of an output device accepted by the system feature accepting unit 122 is acquired, and the conversion processing unit 131 performs different processing on the input image, depending on the information. More specifically, for example, the conversion processing unit 131 has a correspondence table between a bit length Cb of a camera input, a bit length Ob of an output device, and a bit length Ib of internal processing, and acquires a bit length of internal processing corresponding to a bit length of a camera input and a bit length of an output device accepted by the system feature accepting unit 122, from the correspondence table. For example, the conversion processing unit 131 has an operation expression for calculating a bit length Ib of internal processing, using, as parameters, a bit length Cb of a camera input and a bit length Ob of an output device, substitutes a bit length of a camera input and a bit length of an output device accepted by the system feature accepting unit 122 for the operation expression, and executes the operation expression, thereby calculating a bit length of internal processing.

Furthermore, for example, information related to a relationship between a camera feature, a transmission line feature, and an output device feature accepted by the system feature accepting unit 122 is acquired, and the conversion processing unit 131 performs different processing on the input image, depending on the information. For example, in the conversion processing unit 131, a camera feature, a transmission line feature, and an output device feature are stored in association with information indicating the level of noise removing processing, and the conversion processing unit 131 reads information indicating the level of noise removing processing that is paired with a camera feature, a transmission line feature, and an output device feature accepted by the system feature accepting unit 122, and performs the noise removing processing on the input image using the information. For example, in the conversion processing unit 131, a camera feature, a transmission line feature, and an output device feature are stored in association with information indicating the level of resolution creating processing, and the conversion processing unit 131 reads information indicating the level of resolution creating processing that is paired with a camera feature, a transmission line feature, and an output device feature accepted by the system feature accepting unit 122, and performs the resolution creating processing on the input image using the information. The noise removing processing and the resolution creating processing are known techniques, and thus a detailed description thereof has been omitted.

Furthermore, the conversion processing unit 131 preferably performs processing within predetermined resources, according to the one or more system features accepted by the system feature accepting unit 122.

The resources are, for example, the circuit scale, the memory size, the power consumption, the heat generation amount, the number of steps, or the like.

For example, if a multiply-accumulate operation is executed on a tap located in spacetime, the resources increase in accordance with an increase in the number of taps, and increase also in accordance with an increase in the bit length of internal processing. Accordingly, for example, if the bit length of internal processing is 10 bits whereas the bit length of internal processing is 8 bits, it is possible to perform processing at the same resources by reducing the number of taps.

The output unit 14 outputs the output image acquired by the conversion processing unit 131. The output is a concept that encompasses display on a display screen, projection using a projector, printing by a printer, output of a sound, transmission to an external apparatus, accumulation in a storage medium, delivery of a processing result to another processing apparatus or another program, and the like.

The storage unit 11 is preferably a non-volatile storage medium, but may be realized also by a volatile storage medium.

There is no limitation on the procedure in which information is stored in the storage unit 11. For example, information may be stored in the storage unit 11 via a storage medium, information transmitted via a communication line or the like may be stored in the storage unit 11, or information input via an input device may be stored in the storage unit 11.

The processing unit 13 and the conversion processing unit 131 may be realized typically by MPUs, memories, or the like. Typically, the processing procedure of the processing unit 13 and the like is realized by software, and the software is stored in a storage medium such as a ROM. Note that the processing procedure may be realized also by hardware (dedicated circuits).

The output unit 14 may be considered to include or not to include an output device, such as a display screen or a speaker. The output unit 14 may be realized, for example, by driver software for an output device, a combination of driver software for an output device and the output device, or the like.

Figure 2:
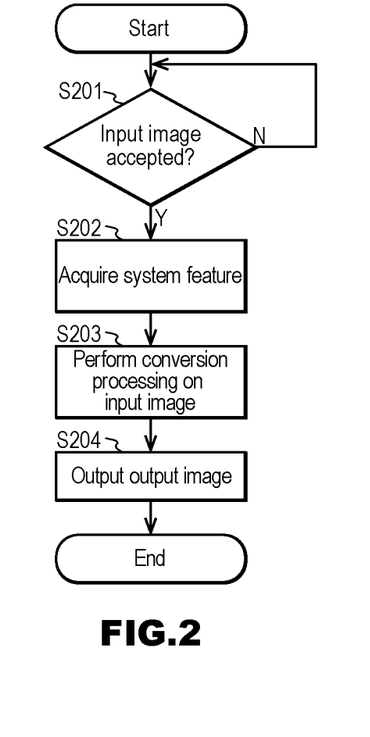
FIG. 2 is a flowchart illustrating an operation of the video signal processing apparatus 1 in the embodiment.

Next, an operation of the video signal processing apparatus 1 will be described with reference to the flowchart in FIG. 2.

(Step S201) The input image accepting unit 121 determines whether or not an input image has been accepted. If an input image has been accepted, the procedure advances to step S202, and, if not, the procedure returns to step S201.

(Step S202) The system feature accepting unit 122 acquires one or more system features.

(Step S203) The conversion processing unit 131 acquires an output image, by converting the input image accepted in step S201, using the system features acquired in step S202.

(Step S204) The output unit 14 outputs the output image acquired in step S203. The processing is ended.

Specific Example

Hereinafter, a specific operation of the video signal processing apparatus 1 in this embodiment will be described.

It is assumed that, in the storage unit 11, two or more LUTs are stored in association with one or more camera features.

Furthermore, it is assumed that each of the two or more correspondence records constituting the LUTs has one or at least two system features and a parameter of an image conversion operation expression. The one or at least two system features contained in each correspondence record are preferably system features that are used to select an LUT. The system features in this case are preferably system features other than camera features.

It is assumed that, in this situation, the input image accepting unit 121 has received an input image. It is assumed that the system feature accepting unit 122 has received one or more system features associated with the input image. The system feature accepting unit 122 reads one or at least two camera features, transmission line features, and output device features from the storage unit 11.

Next, the conversion processing unit 131 acquires one or at least two camera features that are used to select an LUT, from the one or more system features received by the system feature accepting unit 122. Examples of the one or more camera features are described above. The camera features may be determined from a device model of the camera, a recording format, information associated with the input image, or the like. The camera features may be determined from the input image itself. It is preferable that one generic camera feature is held in advance in the storage unit 11, and the generic information is used if no camera feature can be determined from the input image or if no camera feature is used. The generic camera feature is, for example, that the resolution appearance is uniform, the shutter is open, or the like.

Furthermore, the conversion processing unit 131 acquires one or at least two system features that are used to select a correspondence record, from the one or more system features received by the system feature accepting unit 122. The one or more system features that are used to select a correspondence record are, for example, the above-described transmission line features.

The conversion processing unit 131 selects a correspondence record corresponding to the one or more system features, in the LUT corresponding to the acquired one or more camera features.

Next, the conversion processing unit 131 acquires a parameter of an image conversion operation expression contained in the selected correspondence record. The conversion processing unit 131 constructs an image conversion operation expression that is to be applied to the input image, using the image conversion operation expression in the storage unit 11 and the acquired parameter. The acquired parameter is, for example, a coefficient, a spatio-temporal tap arrangement, a processing bit length, a processing determination threshold, or a processing determination feature value, and the constructed image conversion operation expression is, for example, a linear equation for accumulating products of a pixel value and a coefficient. It is possible to use a different image conversion operation expression depending on the determination based on a feature value that is obtained from the input image.

Next, the conversion processing unit 131 changes the input image, using the constructed image conversion operation expression, thereby acquiring a first changed image.

The conversion processing unit 131 may change the spatio-temporal tap arrangement according to one or more camera features. The changing the spatio-temporal tap arrangement is, for example, changing a range or a position of a space tap according to an optical feature of a camera, or changing a range or a position of a time tap according to a shutter or a recording format of a camera.

Furthermore, the conversion processing unit 131 preferably performs an operation using the image conversion operation expression, at the level of operation precision based on the acquired processing bit length.

Furthermore, the conversion processing unit 131 acquires one or at least two transmission line features, in the system features received by the system feature accepting unit 122.

The conversion processing unit 131 performs processing that removes coding distortion from the first changed image, using the one or more transmission line features, thereby acquiring a second changed image. More specifically, the conversion processing unit 131 acquires a parameter of an image conversion operation expression corresponding to the one or more transmission line features. The conversion processing unit 131 constructs an image conversion operation expression that is to be applied to the input image, using the image conversion operation expression in the storage unit 11 and the acquired parameter. Next, the conversion processing unit 131 changes the first changed image, using the constructed image conversion operation expression, thereby acquiring a second changed image.

The conversion processing unit 131 may change the spatio-temporal tap arrangement according to one or more transmission line features. The changing the spatio-temporal tap arrangement is, for example, changing a range or a position of a spatio-temporal tap according to a coding method or a bit rate.

Furthermore, the conversion processing unit 131 further changes the second changed image, using the one or more output device features acquired by the system feature accepting unit 122, thereby acquiring an output image.

The conversion processing unit 131 may obtain an output image from the input image through batch processing in consideration of all camera features, transmission line features, and output device features, instead of obtaining the first changed image, the second changed image, and the output image in a stepwise manner. That is to say, for example, the conversion processing unit 131 may acquire a spatio-temporal tap arrangement and an image conversion operation expression corresponding to all of the one or more camera features, the one or more transmission line features, and the one or more output device features, from the storage unit 11, and acquire an output image from the input image, using the spatio-temporal tap arrangement and the image conversion operation expression. The processing that acquires an output image from the input image using the spatio-temporal tap arrangement and the image conversion operation expression is typically processing that converts one or more pixels corresponding to the spatio-temporal tap arrangement, using the image conversion operation expression, thereby acquiring one or more pixels in an output image corresponding to the spatio-temporal tap arrangement, and obtains an output image containing the one or more pixels. The one or more pixels are pixels in the input image.

The output unit 14 outputs the output image.

As described above, according to this embodiment, it is possible to perform video signal processing in consideration of one or more system features from when an image is acquired to when an image is output.

According to this embodiment, it is preferable to acquire an output image, using two or more different types of system features. In the system features, a camera feature, a transmission line feature, and an output device feature are of different types.

The processing in this embodiment may be realized by software. The software may be distributed by software downloads or the like. Furthermore, the software may be distributed in a form where the software is stored in a storage medium such as a CD-ROM. Note that the same is applied to other embodiments described in this specification. The software that realizes the video signal processing apparatus 1 in this embodiment is the following sort of program. Specifically, this program is a program for causing a computer to function as: a system feature accepting unit that accepts one or at least two system features from when an image is acquired to when an image is output; an input image accepting unit that accepts an input image; a conversion processing unit that performs conversion processing that acquires an output image from the input image, using the system features; and an output unit that outputs the output image acquired by the conversion processing unit.

It is preferable that, according to the program, the program causes the computer to function such that a computer-accessible storage medium includes a storage unit in which two or more look-up tables having one or more correspondence records for identifying correspondence between an input image and an output image are stored each in association with one or at least two system features, wherein the conversion processing unit selects a look-up table corresponding to the one or more system features accepted by the system feature accepting unit, from among the two or more look-up tables, and performs conversion processing that acquires an output image from the input image, using the selected look-up table.

It is preferable that, according to the program, the program causes the computer to function such that a computer-accessible storage medium includes a storage unit in which an image conversion operation expression, which is an operation expression for performing image conversion, is stored, and in which one or at least two pieces of change information, which is information for changing a parameter of an image conversion operation expression, is stored in association with one or at least two system features, wherein the conversion processing unit acquires change information corresponding to the one or more system features accepted by the system feature accepting unit, changes the image conversion operation expression, using the change information, and performs conversion processing that acquires an output image from the input image, using the changed image conversion operation expression.

It is preferable that, according to the program, the program causes the computer to function such that a computer-accessible storage medium includes a storage unit in which one or at least two pieces of change information for changing a spatio-temporal tap arrangement are stored in association with one or at least two system features, wherein the conversion processing unit acquires change information corresponding to the one or more system features accepted by the system feature accepting unit, and performs conversion processing that acquires an output image from the input image, using the change information.

Figure 3:
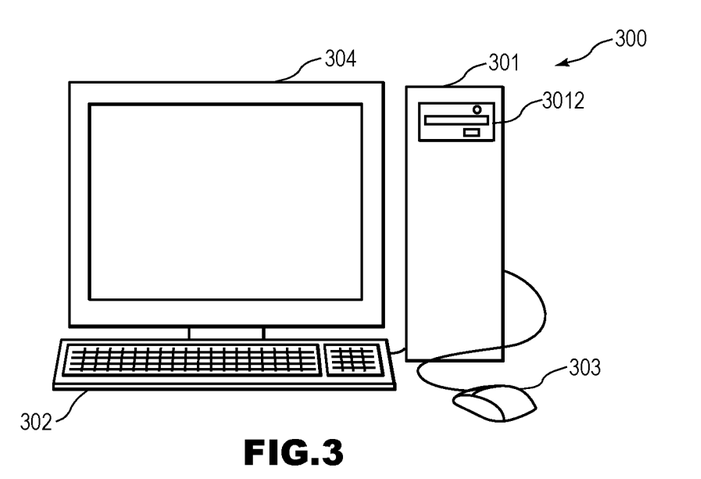
FIG. 3 is a schematic view of a computer system in the embodiment.
Figure 4:
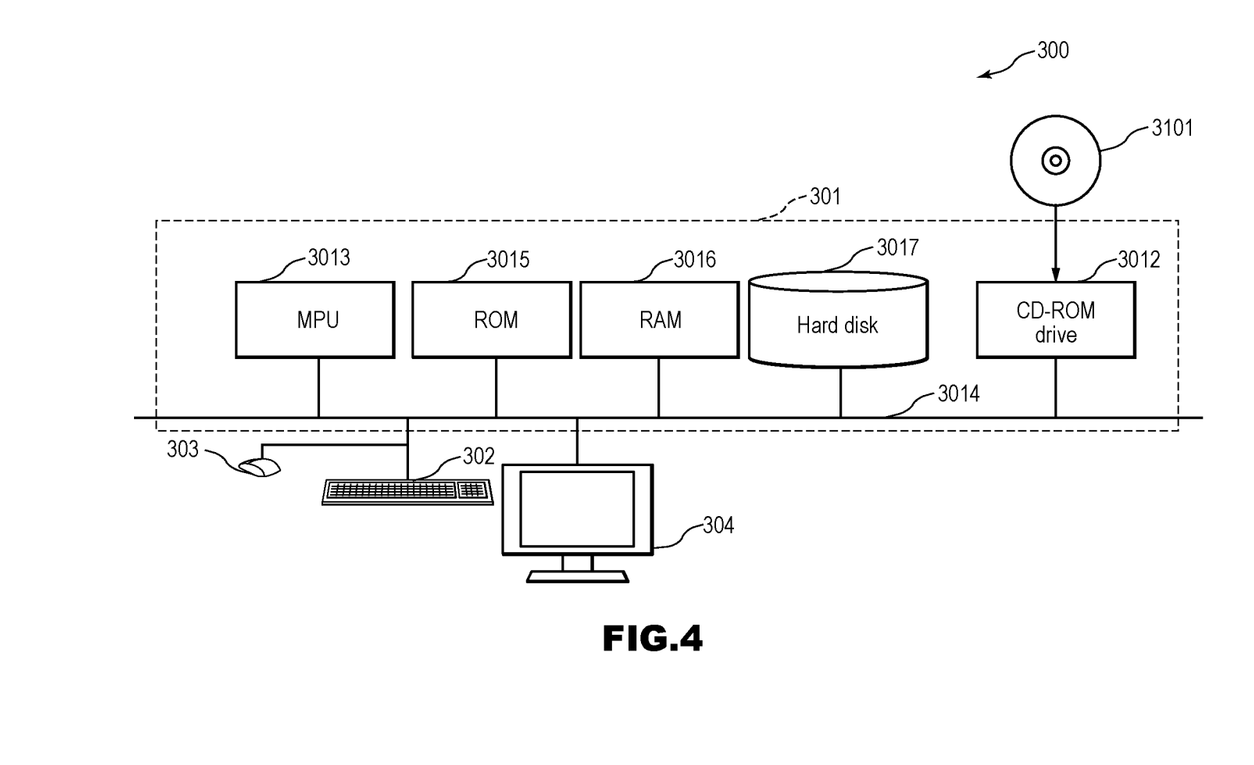
FIG. 4 is a block diagram of the computer system in the embodiment.

FIG. 3 shows the external appearance of a computer that executes the programs described in this specification to realize the video signal processing apparatus 1 in the foregoing various embodiments. The foregoing embodiments may be realized using computer hardware and a computer program executed thereon. FIG. 3 is a schematic view of a computer system 300. FIG. 4 is a block diagram of the system 300.

In FIG. 3, the computer system 300 includes a computer 301 including a CD-ROM drive 3012, a keyboard 302, a mouse 303, and a monitor 304.

In FIG. 4, the computer 301 includes the CD-ROM drive 3012, an MPU 3013, a bus 3014, a ROM 3015, a RAM 3016, and a hard disk 3017. In the ROM 3015, a program such as a boot up program is stored. The RAM 3016 is connected to the MPU 3013 and is a memory in which a command of an application program is temporarily stored and a temporary storage area is provided. In the hard disk 3017, typically, an application program, a system program, and data are stored. Although not shown, the computer 301 may further include a network card that provides connection to a LAN.

The programs for causing the computer system 300 to execute the functions of the video signal processing apparatus 1 in the foregoing embodiments may be stored in a CD-ROM 3101 that is inserted into the CD-ROM drive 3012, and be transmitted to the hard disk 3017. Alternatively, the programs may be transmitted via a network (not shown) to the computer 301 and stored in the hard disk 3017. At the time of execution, the programs are loaded into the RAM 3016. The programs may be loaded from the CD-ROM 3101, or directly from a network.

The programs do not necessarily have to include, for example, an operating system (OS) or a third party program to cause the computer 301 to execute the functions of the video signal processing apparatus 1 in the foregoing embodiments. The programs may only include a command portion to call an appropriate module in a controlled mode and obtain desired results. The manner in which the computer system 300 operates is well known, and thus a detailed description thereof has been omitted.

It should be noted that, in the programs, in a step of transmitting information, a step of receiving information, or the like, processing that is performed by hardware, for example, processing performed by a modem or an interface card in the transmitting step (processing that can be performed only by hardware) is not included.

Furthermore, the computer that executes the programs may be a single computer, or may be multiple computers. That is to say, centralized processing may be performed, or distributed processing may be performed.

Furthermore, in the foregoing embodiments, it will be appreciated that two or more communication parts in one apparatus may be physically realized by one medium.

In the foregoing embodiments, each process (each function) may be realized as centralized processing using a single apparatus (system), or may be realized as distributed processing using multiple apparatuses.

The present invention is not limited to the embodiment set forth herein. Various modifications are possible within the scope of the present invention.

As described above, the video signal processing apparatus according to the present invention has an effect that it is possible to perform video signal processing in consideration of features of a system from when an image is acquired to when an image is output, and thus this apparatus is useful as a television receiver and the like.

What is claimed is:

1. A video signal processing apparatus comprising:
a first storage unit in which one or more pieces of change information for changing a spatio-temporal tap arrangement are stored in association with one or at least two system features;
a system feature accepting unit that accepts one or at least two system features from when an image is acquired to when an image is output;
an input image accepting unit that accepts an input image;
a conversion processing unit that performs conversion processing that acquires an output image from the input image, using the system features; and
an output unit that outputs the output image acquired by the conversion processing unit,
wherein the conversion processing unit acquires, from the first storage unit, change information corresponding to the one or at least two system features accepted by the system feature accepting unit, and performs conversion processing that acquires an output image from the input image by changing a spatio-temporal tap arrangement of the input image using the change information.

2. The video signal processing apparatus according to claim 1, wherein the system features include a camera feature, which is a feature of a camera that captures an image.

3. The video signal processing apparatus according to claim 1, wherein the system features include a transmission line feature, which is a feature of a transmission line through which an image is transmitted.

4. The video signal processing apparatus according to claim 1, wherein the system features include an output device feature, which is a specific feature of an output apparatus that outputs an image.

5. The video signal processing apparatus according to claim 1, wherein the system feature accepting unit accepts one or at least two system features from outside of the video signal processing apparatus.

6. The video signal processing apparatus according to claim 1, further comprising a second storage unit in which two or more look-up tables having one or more correspondence records for identifying correspondence between an input image and an output image are stored each in association with one or at least two system features,
wherein the conversion processing unit selects a look-up table corresponding to the one or more system features accepted by the system feature accepting unit, from among the two or more look-up tables stored in the second storage unit, and performs conversion processing that acquires an output image from the input image, using the selected look-up table.

7. The video signal processing apparatus according to claim 1, further comprising a second storage unit in which an image conversion operation expression, which is an operation expression for performing image conversion, is stored, and in which one or at least two pieces of change information, which is information for changing a parameter of an image conversion operation expression, is stored in association with one or at least two system features,
wherein the conversion processing unit acquires change information corresponding to the one or more system features accepted by the system feature accepting unit, changes the image conversion operation expression, using the change information, and performs conversion processing that acquires an output image from the input image, using the changed image conversion operation expression.

8. A video signal processing method realized by a first storage unit, a system feature accepting unit, an input image accepting unit, a conversion processing unit, and an output unit, the first storage unit storing one or more pieces of change information for changing a spatio-temporal tap arrangement in association with one or at least two system features, the video signal processing method comprising
a system feature accepting step of the system feature accepting unit accepting one or at least two system features from when an image is acquired to when an image is output;
an input image accepting step of the input image accepting unit accepting an input image;
a conversion processing step of the conversion processing unit performing conversion processing that acquires an output image from the input image, using the system features; and
an output step of the output unit outputting the output image acquired in the conversion processing step,
in the conversion processing step, change information corresponding to the one or at least two system features accepted in the system feature accepting step is acquired from the first storage unit, and conversion processing that acquires an output image from the input image is performed by changing a spatio-temporal tap arrangement of the input image using the change information.

9. A non-transitory computer readable medium storing a program for causing a computer to function as:
a first storage unit in which one or more pieces of change information for changing a spatio-temporal tap arrangement are stored in association with one or at least two system features;
a system feature accepting unit that accepts one or at least two system features from when an image is acquired to when an image is output;
an input image accepting unit that accepts an input image;
a conversion processing unit that performs conversion processing that acquires an output image from the input image, using the system features; and
an output unit that outputs the output image acquired by the conversion processing unit,
wherein the conversion processing unit acquires, from the first storage unit, change information corresponding to the one or at least two system features accepted by the system feature accepting unit, and performs conversion processing that acquires an output image from the input image by changing a spatio-temporal tap arrangement of the input image using the change information.

* * * * *